(12) United States Patent
Gudasic

(10) Patent No.: US 10,767,757 B2
(45) Date of Patent: Sep. 8, 2020

(54) SHIFTER FOR CONTROLLING THE TRANSMISSION OF A MOTOR VEHICLE, AND A METHOD FOR CONTROLLING THE TRANSMISSION OF A VEHICLE WITH A SHIFTER

(71) Applicant: KONGSBERG AUTOMOTIVE AB, Mullsjo (SE)

(72) Inventor: Mattias Gudasic, Habo (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 171 days.

(21) Appl. No.: 15/578,555

(22) PCT Filed: Jun. 3, 2015

(86) PCT No.: PCT/EP2015/062441
§ 371 (c)(1),
(2) Date: Nov. 30, 2017

(87) PCT Pub. No.: WO2016/192793
PCT Pub. Date: Dec. 8, 2016

(65) Prior Publication Data
US 2018/0156328 A1    Jun. 7, 2018

(51) Int. Cl.
*F16H 59/08* (2006.01)
*F16H 59/02* (2006.01)
(Continued)

(52) U.S. Cl.
CPC ......... *F16H 59/08* (2013.01); *F16H 59/0204* (2013.01); *F16H 61/24* (2013.01);
(Continued)

(58) Field of Classification Search
CPC ...... F16H 59/08; F16H 59/0204; F16H 61/24; F16H 63/42; F16H 2059/081; F16H 2061/247; F16H 2063/423
See application file for complete search history.

(56) References Cited

U.S. PATENT DOCUMENTS 5,307,013 A * 4/1994 Santos ................. F16H 59/105
324/207.2
5,370,015 A * 12/1994 Moscatelli ............ B60K 37/06
74/335
(Continued)

FOREIGN PATENT DOCUMENTS

EP    1450077 A2    8/2004
EP    2159455 A1    3/2010
(Continued)

OTHER PUBLICATIONS

Written Opinion of International Searching Authority dated Mar. 12, 2017, International Application No. PCT/EP2015/062441, 11 pages.

*Primary Examiner* — Vicky A Johnson
(74) *Attorney, Agent, or Firm* — Cantor Colburn LLP

(57) ABSTRACT

A shifter for controlling a transmission of a motor vehicle includes a rotatably mounted actuation element, a sensor assembly including a first element having a plurality of binary sensors and a second element having a trigger device. A control unit determines an angular position of the actuation element based on an input signal from the sensor assembly. The binary sensors and the trigger device are arranged such that each binary sensor corresponds to one trigger line comprising a plurality of trigger elements. The trigger elements are distributed along the trigger line such that at least one the binary sensors is able to detect a presence of a trigger element for each angular position of the actuation element. At least one trigger element from each trigger line together form a trigger pattern, and the trigger pattern is repeated at least twice on the trigger device to initiate a shift command.

14 Claims, 9 Drawing Sheets

(51) Int. Cl.
   *F16H 61/24* (2006.01)
   *F16H 63/42* (2006.01)
   *F16H 61/12* (2010.01)

(52) U.S. Cl.
   CPC ....... *F16H 63/42* (2013.01); *F16H 2059/081* (2013.01); *F16H 2061/1208* (2013.01); *F16H 2061/1284* (2013.01); *F16H 2061/247* (2013.01); *F16H 2063/423* (2013.01)

(56) References Cited

U.S. PATENT DOCUMENTS

| | | | | |
|---|---|---|---|---|
| 5,561,416 | A * | 10/1996 | Marshall | B60K 37/06 340/456 |
| 5,748,112 | A * | 5/1998 | Glonner | F16H 59/105 341/16 |
| 6,376,929 | B1 * | 4/2002 | Nakajima | F16H 59/105 307/10.1 |
| 6,550,351 | B1 * | 4/2003 | O'Reilly | F16H 59/105 74/335 |
| 8,051,740 | B2 * | 11/2011 | Giefer | B60K 37/06 74/473.21 |
| 2011/0296942 | A1 * | 12/2011 | Wu | F16H 59/105 74/473.12 |
| 2018/0156328 | A1 * | 6/2018 | Gudasic | F16H 59/08 |

FOREIGN PATENT DOCUMENTS

| | | |
|---|---|---|
| EP | 2672149 A1 | 12/2013 |
| FR | 2836974 A1 | 9/2003 |
| WO | 2006021198 A1 | 3/2006 |

\* cited by examiner

SHIFTER FOR CONTROLLING THE TRANSMISSION OF A MOTOR VEHICLE, AND A METHOD FOR CONTROLLING THE TRANSMISSION OF A VEHICLE WITH A SHIFTER

CROSS REFERENCE TO RELATED APPLICATIONS

This application is a National Stage application of PCT/EP2015/062441, filed Jun. 3, 2015, which is incorporated by reference in its entirety herein.

TECHNICAL FIELD

The present invention relates to a shifter for controlling the transmission of a motor vehicle, and a method for controlling the transmission of a vehicle with a shifter.

Within the field of motor vehicles, a shifter is generally used to allow a driver to manually select a gear or state of transmission. The shifter is connected to the transmission in such a way that the selection made is allowed to determine the operation of the transmission and thus control the operation of the vehicle.

The shifter itself can be of different designs, and is often in the form of a gear shift lever or an actuation element that can be moved along a path or rotated between different angular positions corresponding to gears or modes of transmission. If a rotatable actuation element is used, an angular position of the shifter thus corresponds to a specific state of transmission, such as Park, Reverse, Neutral and Drive for instance. One shifter with a rotatable actuation element in the form of a knob is disclosed by FR2836974 (Renault), and another by EP2159455 (Dura).

If the actuation element can rotate 360°, the shifter has the advantage that a particular angular position of the actuation element does not need to be linked to a particular state or mode of the transmission. Rather, a control unit arranged in communication with the shifter may determine the current position of the actuation element and decide which state of transmission this position should correspond to at the present time. This is particularly advantageous in a situation where the driver has switched off the ignition and left the car with the shifter in the Drive position and the vehicle has itself engaged the Park position. When the driver returns to the vehicle and switches the ignition on, the control unit can detect the current position of the actuation element and determine that it should now be considered the Park position. The remaining states of transmission can then be reassigned to the other angular positions of the actuation element to reflect this decision, and this feature of a shifter is generally known as a software implemented automatic return to park A problem with shifters having rotatable actuation elements is that the detection of an angular position is often unreliable, especially when the actuation element lacks end positions, i.e. can be rotated 360°. If a position is misinterpreted as another, the transmission becomes unreliable and the driver risks potentially dangerous situations where he or she is unable to control the vehicle in traffic.

On the other hand, providing a shifter with fault detection and reliable checks to make sure that the state of transmission intended by the driver is indeed the one being set by the transmission generally makes the shifter itself increasingly complicated and expensive.

There is generally a need for a reliable shifter solving these problems while at the same time being cost effective and sturdy.

DISCLOSURE OF INVENTION

The object of the invention is to eliminate or at least to minimize the problems discussed above. This is achieved through a shifter for controlling the transmission of a motor vehicle and by a method for controlling the transmission of a motor vehicle according to the appended independent claims, wherein the sensor assembly comprises at least three binary sensors, the binary sensors and the trigger device are arranged in such a way that each binary sensor corresponds to one trigger line of the trigger device, wherein the trigger line comprises a plurality of trigger elements that are arranged to be individually detectable by the binary sensor, and wherein the trigger elements are distributed along the trigger lines in such a way that at least one but not all of the binary sensors are able to detect the presence of a trigger element for each angular position of the actuation element. Thanks to this distribution of trigger elements and the use of binary sensors, a plurality of angular positions can be characterized each by an individual distribution of trigger elements and each such position can be detected in a reliable way.

Thanks to the invention, a cost effective shifter is achieved, minimizing the risk of faulty detection and allowing for a safe and reliable operation of the shifter so that the state of transmission selected by the driver is also the one being effected by the transmission.

According to an aspect of the invention, the sensor assembly further comprises a detent track arranged on one of the first element and the second element, and a detent plunger arranged on the other of the first element and second element, and wherein the detent track and detent plunger are arranged to interact in such a way that every angular position of the actuation element corresponds to a rest position for the detent plunger along the detent track. Thereby, discrete positions are created, minimizing the risk of an angular position being detected when the actuation element is between two such positions.

According to another aspect of the invention, at least one trigger element from each trigger line together form a trigger pattern, and the trigger pattern is repeated at least twice on the trigger device, preferably at least four times. Thereby, a software implemented automated return to park with a reassignment of angular position and state of transmission can be repeated starting from any given angular position of the actuation element.

According to yet another aspect of the invention, at least two of the angular positions of the actuation element are associated each with a state of transmission of the motor vehicle. Thereby, shift commands can be given by rotating the actuation element between these positions and the operation of the transmission altered accordingly.

According to a further aspect of the invention, a rotation of the actuation element through every position that corresponds to a state of transmission extends over more than one trigger pattern. Thereby, the same binary code will be used for several positions and the shifter will be able to readjust itself and the same amount of sensors and binary coding can be used for different shifters.

According to yet another aspect of the invention, the control unit is arranged to compare a current position of the actuation element with a current state of transmission and determine if they are associated with each other, and to associate them if the position is associated with another state of transmission. Thereby, the software implemented return to park function as discussed above is enabled.

According to a further aspect of the invention, each angular position of the actuation element corresponds to a binary code in the control unit in such a way that a binary sequence is formed by the binary codes for all angular positions, and the control unit is arranged to detect a fault if the actuation element is rotated from a first position to a second position, and the binary code for the second position is not adjacent to the binary code for the first position in the binary sequence. Thereby, the shifter is set to discover if an error has occurred, further minimizing the risk of faulty operation.

According to yet another aspect of the invention, the control unit is arranged to detect a fault if all the binary sensors detect the presence of a trigger element at the same time, or if no binary sensor detect the presence of a trigger element. Thereby, a fault resulting from damaged sensors or from the occurrence of dirt or the like forming on the trigger lines to create additional unintended detection elements can be discovered.

According to a further aspect of the invention, the control unit determines a current position of the actuation element at least partly based on a previously detected position. Thereby, an additional fault detection can be provided.

According to yet another aspect of the invention, a visual indication element can be used to indicate the state of transmission associated with the angular position of the actuation element. Thereby, the selected state of transmission can be shown to the driver.

Many more advantages and benefits of the invention will become readily apparent to the person skilled in the art in view of the detailed description below.

BRIEF DESCRIPTION OF DRAWINGS

The invention will now be described in more detail with reference to the appended drawings, wherein.

DETAILED DESCRIPTION

Figure 1:
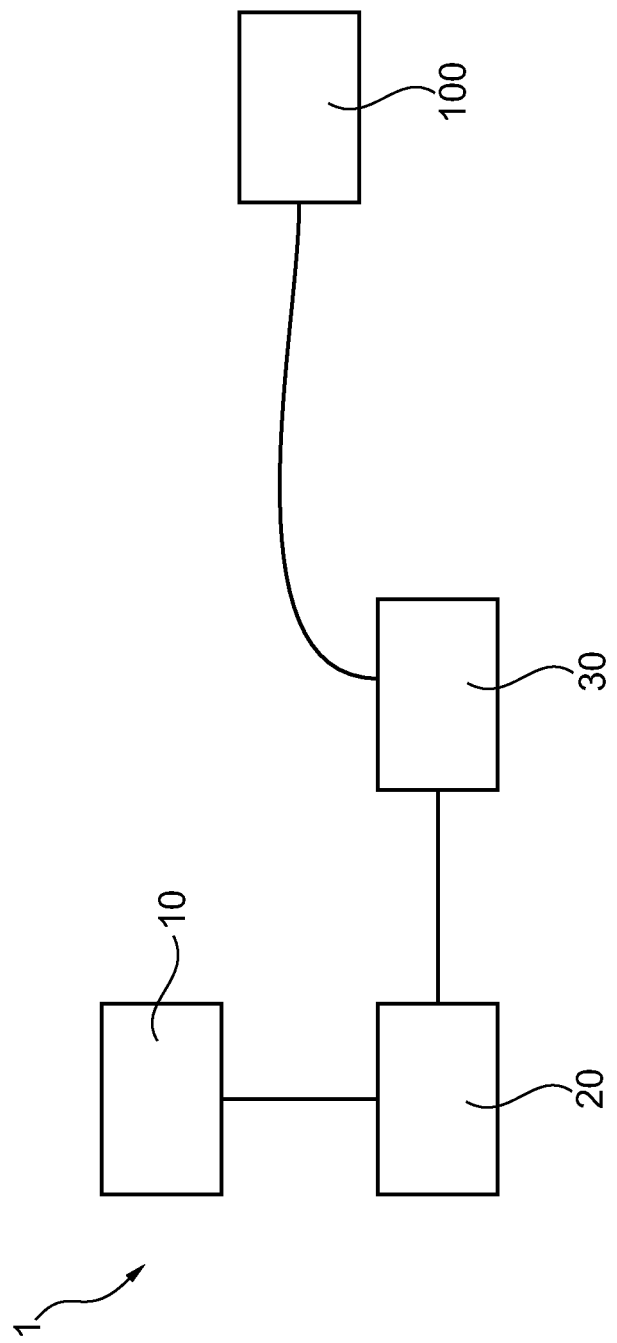
FIG. 1 shows a schematic view of a shifter according to the invention.

FIG. 1 discloses schematically a shifter 1 according to the invention, with an actuation element 10 that can be actuated by a driver of a vehicle to reach an angular position that indicates a state of transmission. The actuation element communicates with a sensor assembly 20 as will be described in detail further below, and the sensor assembly 20 interprets the angular position of the actuation element 10 and creates a binary code associated with the position; the signal itself is transmitted to a control unit 30 for further analysis. Thus, the control unit 30 is able to determine an angular position of the actuation element 10 based on an input signal from the sensor assembly 20. The control unit 30 communicates with a transmission 100 of the vehicle by sending a shift command based on the binary code.

Figure 2:
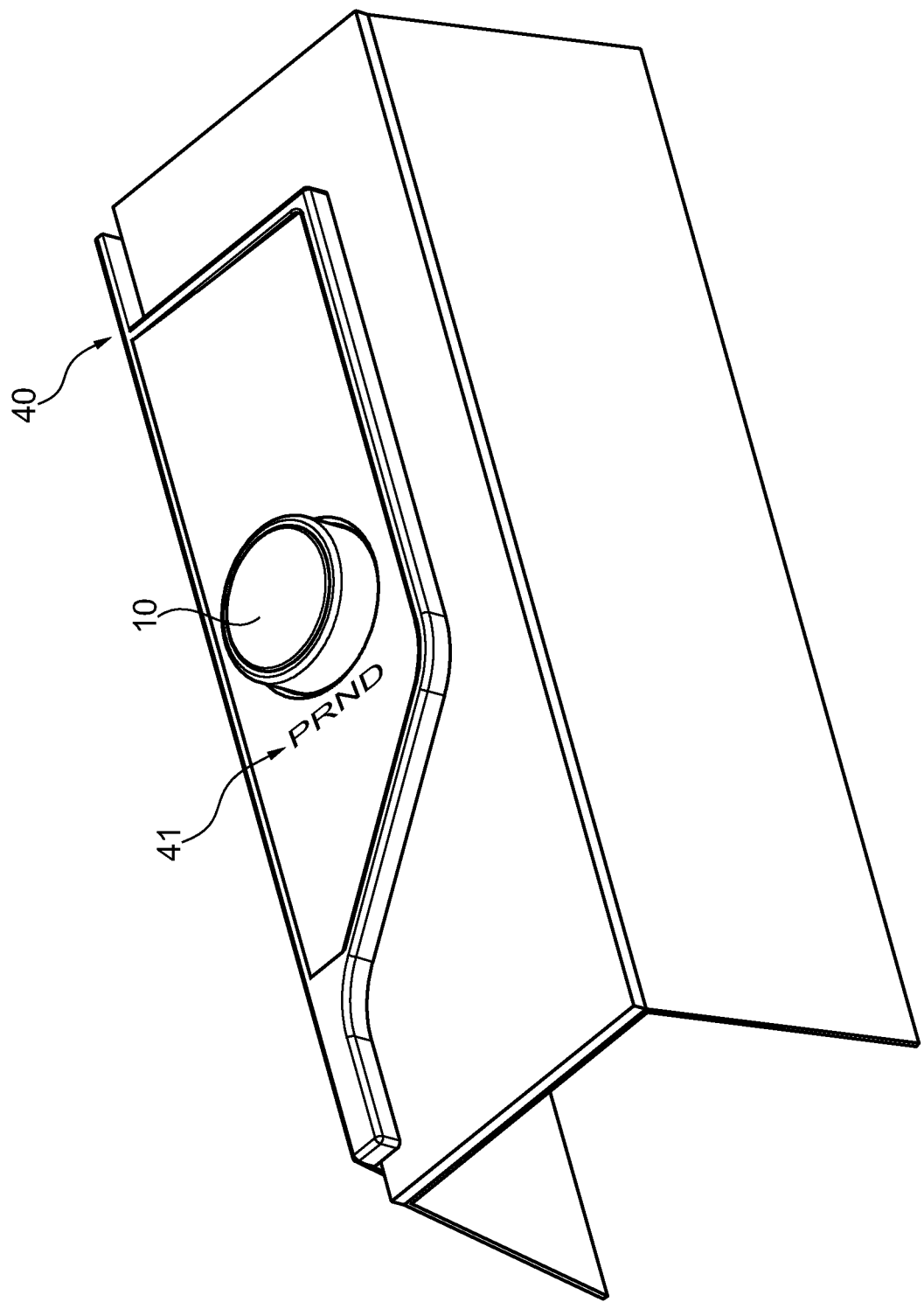
FIG. 2 shows a perspective view of the shifter mounted on a console.

FIG. 2 shows the shifter 1 according to a preferred embodiment of the invention mounted in a center console 40 with the actuation element 10 in the form of a rotatable knob protruding from the console 40. The console further comprises visual indication element 41, in this embodiment in the form of the letters P, R, N and D that can in turn be lighted by lighting element (not shown) beneath each letter, so that the letter P can for instance be shown when an angular position corresponding to a parking state of transmission has been selected. Of course, the visual indication element 41 can be realized in many different ways, as is well known within the art. The shifter 1 thus mounted in the center console 40 can be mounted in a suitable place in a car so that the actuation element 10 is within easy reach of the driver.

Figure 3:
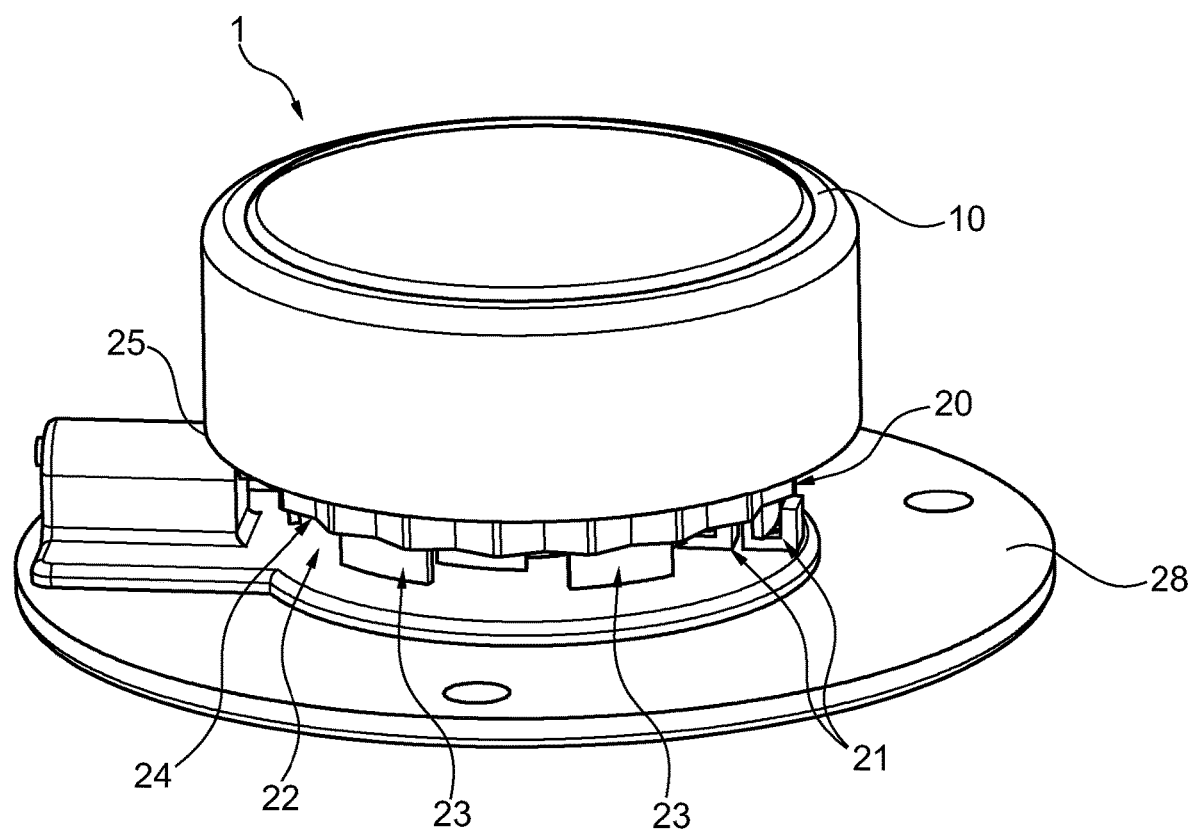
FIG. 3 shows a perspective view of the shifter without console, disclosing the parts of the shifter.
Figure 4:
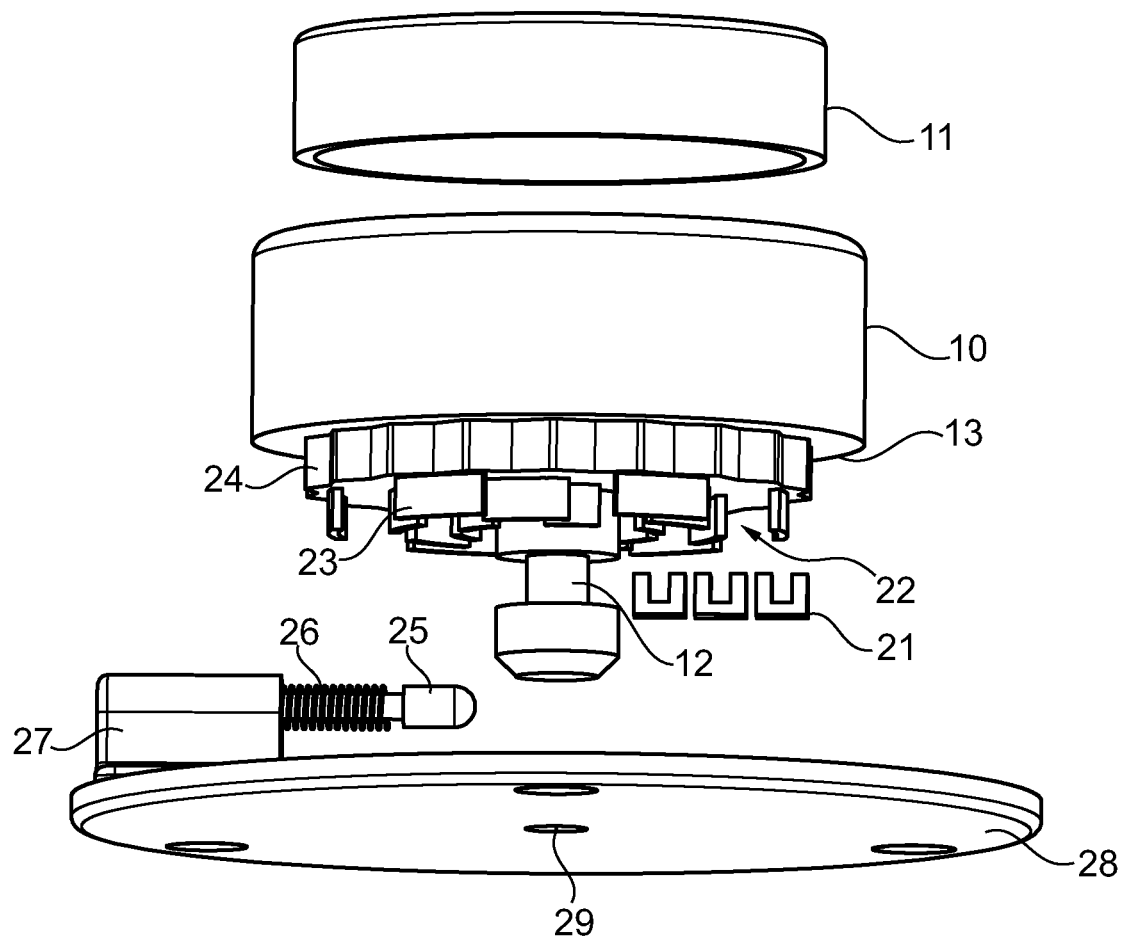
FIG. 4 shows an exploded view of the shifter of FIG. 3.

In FIGS. 3 and 4, the shifter 1 is shown without the center console 40, so that the interaction of the actuation element 10 with the sensor assembly 20 can be seen. Thus, the sensor assembly 20 comprises a plurality of binary sensors 21 mounted on a base 28 and a trigger device 22 mounted on and rigidly coupled to the actuation element 10. The trigger device 22 comprises a plurality of trigger elements 23, in this embodiment in the form of protrusions that are arranged on a lower side 13 of the actuation element 10, as will be shown in more detail below. The trigger elements 23 are thus arranged so that each trigger element 23 can be detected by one binary sensor 21 and generate a binary signal corresponding to the presence or absence of a trigger element at the binary sensor 21. The shifter according to the invention comprises at least three binary sensors 21 and the trigger elements 23 are arranged in such a way that each binary sensor 21 corresponds to one trigger line 50 (see FIG. 6b) of the trigger device 20, as will also be disclosed further below. Furthermore, the sensor assembly 20 comprises a detent track 24 and a detent plunger 25.

The binary sensors 21 and the trigger device 22 each form part of a first element and second element of the sensor assembly 20 and one of these first and second element is rigidly coupled to the actuation element. In this preferred embodiment, the binary sensors 21 form part of the first element and the trigger device 22 form part of the second element, but it is to be noted that the opposite would be equally possible. In such a case, the binary sensors 21 would be mounted on the actuation element 10 and the trigger device on the base 28 of the sensor assembly 20.

The actuation element 10 comprises a top 11 that may be colored or otherwise designed to be easily detectable by sight, and an axle 12 extending from a center of the lower side 13 and mounted in a central opening 29 of the base 28, to allow the actuation element 10 to rotate in relation to the base 28. The detent plunger 25 is spring biased against the detent track 24 by a spring 26 and mounted in a holder 27. The detent track 24 is of a zigzag shape to define a plurality of angular positions, each corresponding to a depression in the detent track 24 and thereby a rest position, to allow the detent plunger 25 to rest there and prevent the actuation element 10 from remaining between these defined angular positions. Rather, the actuation element 10 will, thanks to the interaction of the detent track 24 and the detent plunger 25, be forced towards a defined angular position if the driver ceases to rotate it before a defined position is reached.

In this embodiment, the detent plunger 25 is mounted on the first element which also comprises the binary sensors 21 and the detent track 24 is mounted on the second element where the trigger device 22 can be found, but similarly to the reasoning above regarding the binary sensors 21 and the trigger device 22 the opposite can of course also be true. In that case, the detent track 24 can be mounted on the base 28 along a circumference of the actuation element 10 and the detent plunger 25 be mounted on the actuation element 10 itself and biased against the detent track 24.

Figure 5:
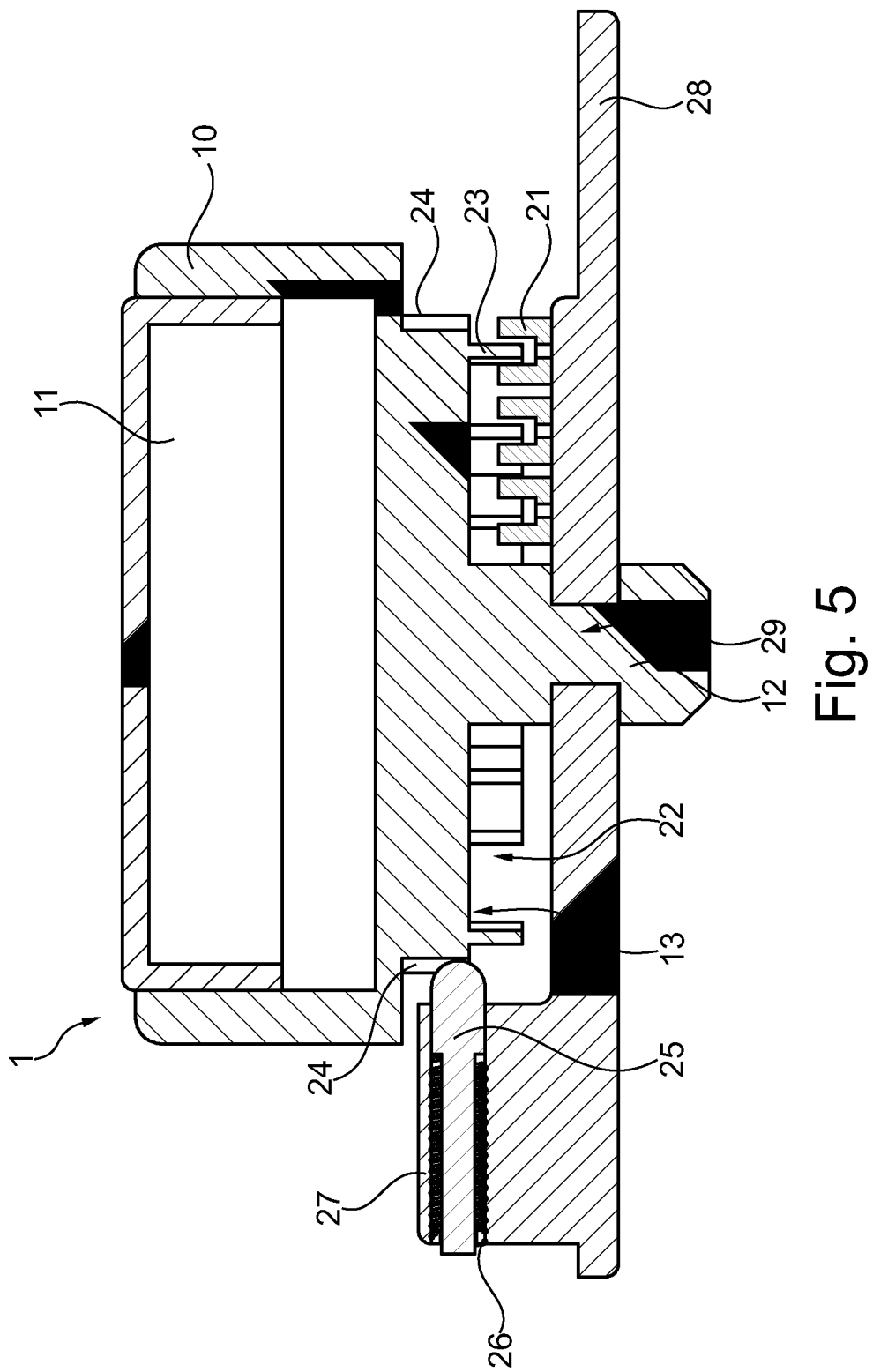
FIG. 5 shows a cross-sectional view of the shifter.

FIG. 5 shows the shifter 1 in a mounted state with axle 12 of the actuation element 10 being held through the opening 29 and the detent plunger 25 biased against the detent track 24. One trigger element 23 is in this position at one of the binary sensors 21 and able to be detected there, whereas the other two binary sensors 21 are not able to detect a presence of a trigger element.

Figure 6A:
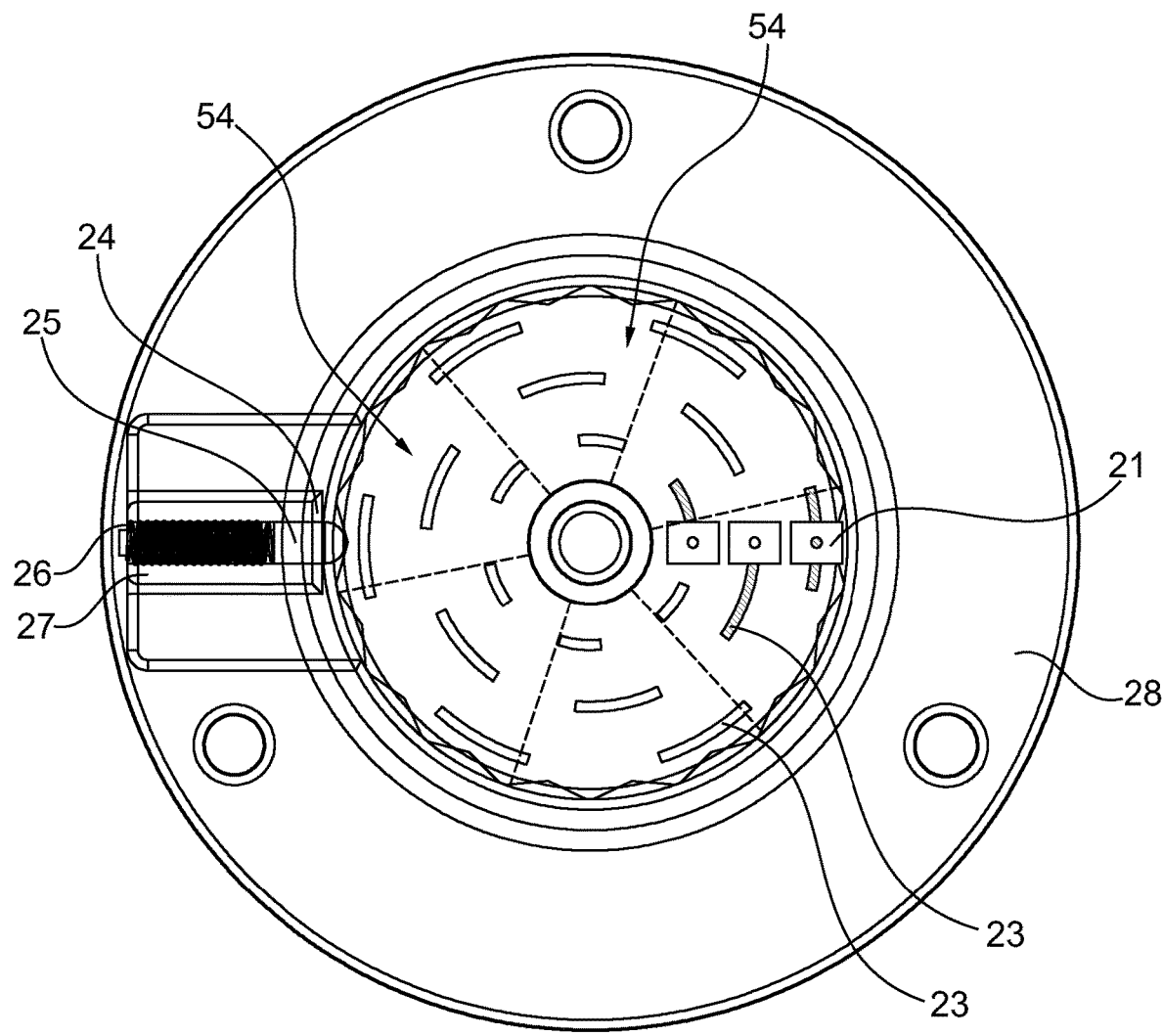
FIG. 6a shows the shifter from above without the actuation element, disclosing a first position of the sensor assembly.
Figure 6B:
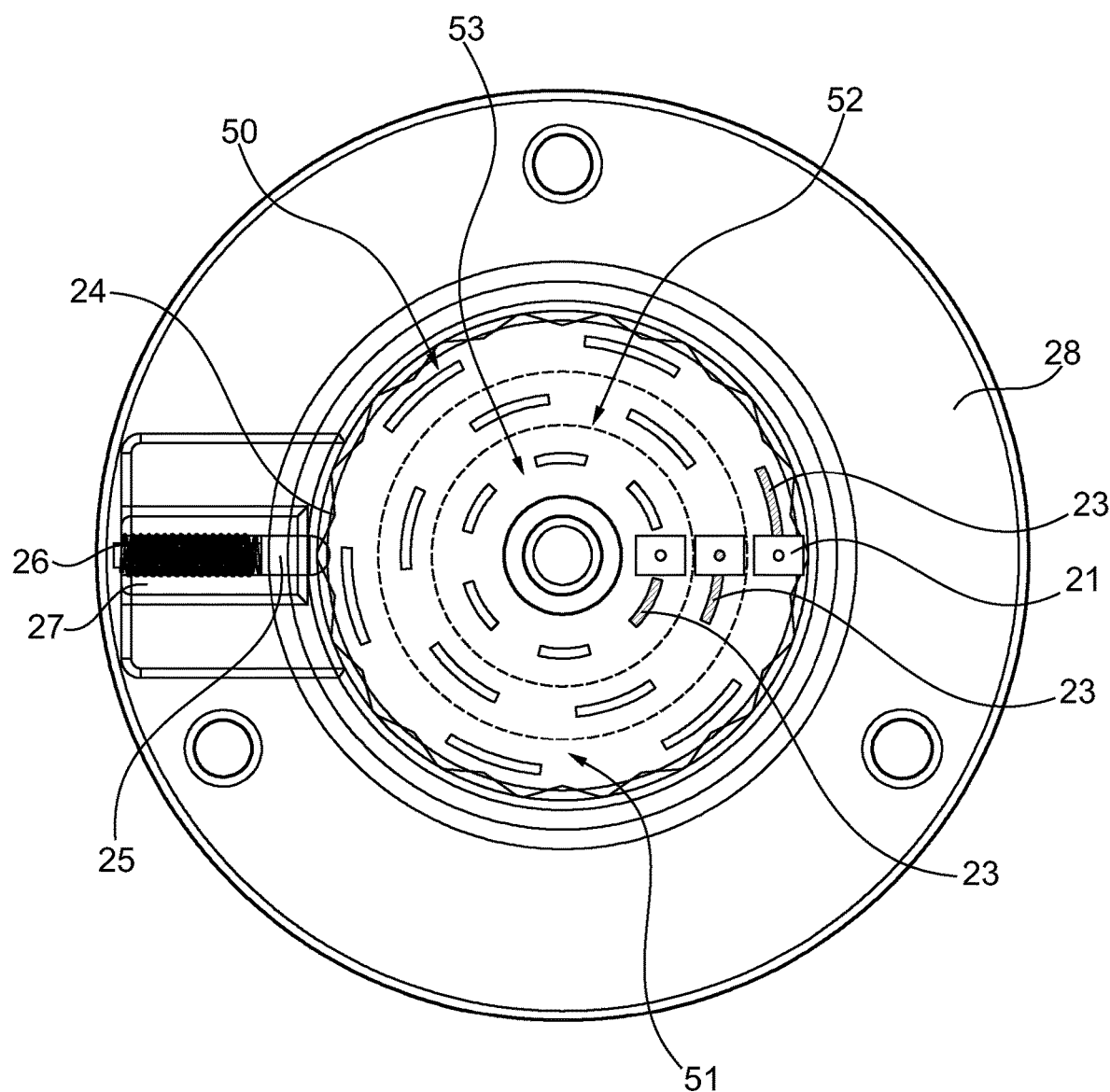
FIG. 6b shows the view of FIG. 6a in a position between the first position of FIG. 6a and a second position of the sensor assembly.
Figure 6C:
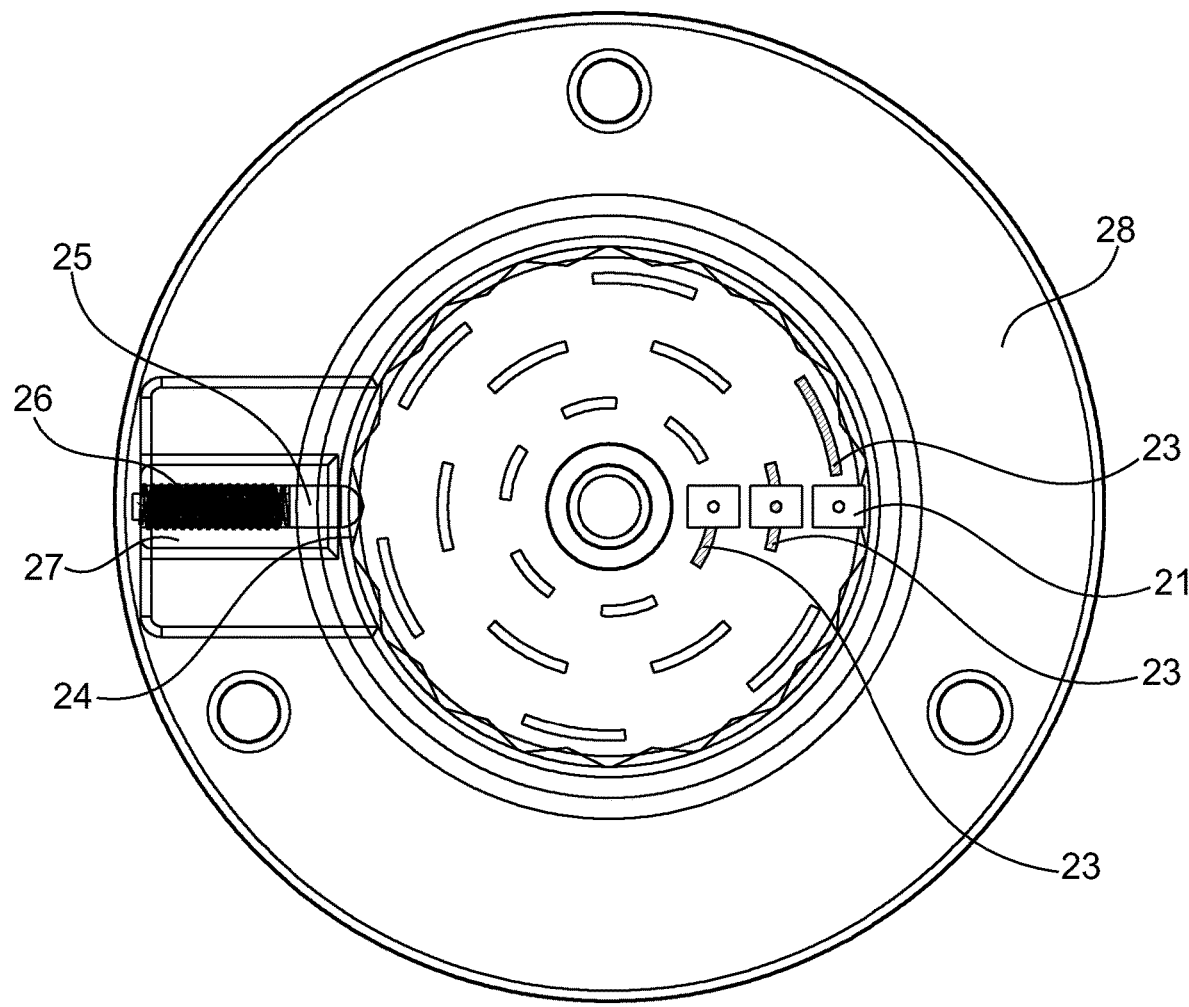
FIG. 6c shows the view of FIG. 6a-6b in the second position of the sensor assembly.

FIG. 6a-6c shows the distribution of the trigger elements 23 on the trigger device 20 and the interaction of the trigger elements 23 with the binary sensors 21. In this preferred embodiment, three binary sensors 21 are used and three corresponding trigger lines 50, 51, 52, 53 are formed. The reference numeral 50 in this context refers to a trigger line in general, whereas 51, 52 and 53 denote each of the three trigger lines shown in the Figures. As can also be seen in FIG. 6a, the trigger elements 23 are distributed in such a way on the trigger device 20 that at least one of the binary sensors 21 is always able to detect a trigger element 23, but that not every one of the binary sensors 21 are able to do so simultaneously at any given angular position of the actuation element 20. The trigger elements 23 are further distributed to form a trigger pattern 54 that is repeated at least twice but preferably at least four times on the trigger device 20.

In general, the method for controlling the transmission of a motor vehicle by with a shifter 1, comprises using at least three binary sensors 21 to detect a presence or absence of a trigger element 23 in a trigger line 50, each binary sensor 21 being able to detect trigger elements 23 of one trigger line 50 and using input from the binary sensors 21 to determine an angular position of the actuation element 10 and determine a state of transmission associated with the angular position. Then, a signal comprising a shift command is transmitted to the transmission 100 of the motor vehicle indicating the state of transmission associated with the angular position. This will now be exemplified with reference to FIGS. 6a-6c and FIG. 7.

When a state of transmission is to be selected, the driver of a vehicle grips the knob of the actuation element 10 and rotates it from one angular position to another. In FIGS. 6a-6c the rotation is counter clockwise but the opposite would of course be equally possible. FIG. 6a discloses one angular position that may correspond to Park, where only one of the binary sensors 21, namely the one to the right in the Figure, is able to detect the presence of a trigger element 23. This would give the binary code 001 (see FIG. 7). In FIGS. 6a-6c three of the trigger elements 23, one from each trigger line 50, is marked to allow for a better understanding of the technology. It is to be noted, however, that each of these trigger elements 23 is identical to other trigger elements 23 in the same trigger line 50.

As the driver turns the actuation element 20, the intermediate position of FIG. 6b is reached. Here, the detent plunger 25 is not in a rest position in the detent track 24 and the actuation element 10 could therefore not remain in the intermediate position, but would be urged towards the next position or, indeed, back towards the previous position. In the intermediate position, two of the binary sensors 21 are able to detect trigger elements 23, namely the one in the middle and to the right, and the corresponding binary code is 011 (see FIG. 7).

When the rotation continues by the driver turning the actuation element 10 still further, the next rest position of the detent track 24 is reached, allowing the detent plunger 25 to rest and hold the actuation element 10. In this position, which may correspond to "Reverse", only one of the binary sensors 21, namely the one in the middle, is able to detect a trigger element 23. This would give the binary code 010 (see FIG. 7).

The binary sensors 21 are in this embodiment optical sensors and signals are continuously transmitted to the control unit 30 to determine the position and movement of the actuation element 10 based on the binary code created. In the operation described above, the control unit 30 would at first receive the signal 001, indicating that the actuation element is in a position associated with the Park state or mode of transmission, and would have given a shift command to the transmission to indicate this state of transmission after the first binary code indicating this position was received. During the movement from Park to Reverse, the control unit 30 receives the binary code 011, corresponding to the intermediate position between Park and Reverse, and finally receives the binary code 010, corresponding to the Reverse state of transmission. A new shift command, indicating the reverse state of transmission, is then sent to the transmission.

Figure 7:
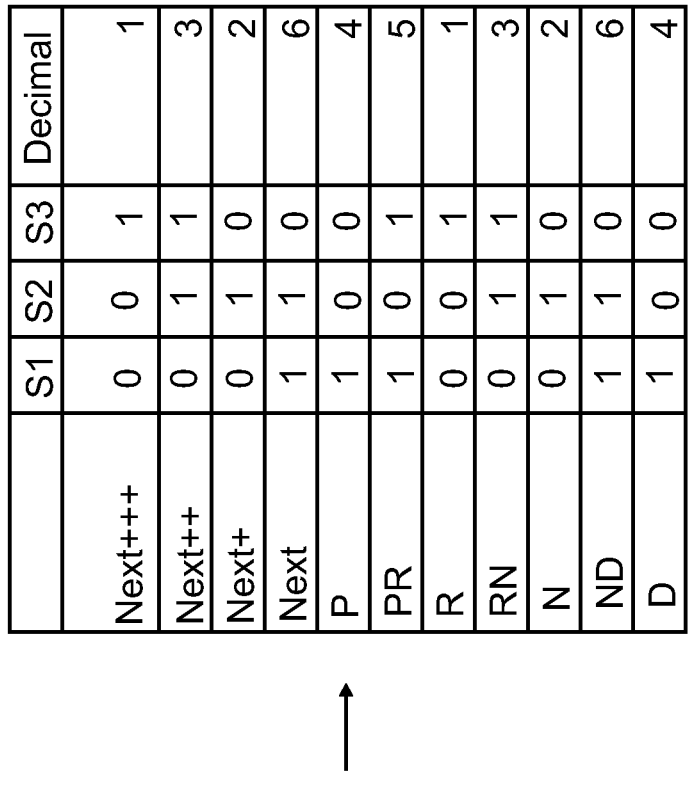
FIG. 7 shows two binary tables with an example of how signals from the sensor assembly can be interpreted as modes of transmission.

Thus, each angular position of the actuation element 10 corresponds to a binary code in the control unit 30 in such a way that a binary sequence is formed by the binary codes for all angular positions as shown in FIG. 7 disclosing one example of the modes of transmissions associated with the binary codes that can be formed by the three binary sensors 21 of this preferred embodiment of the invention. It is to be noted that FIG. 7 merely serves as an example and that an embodiment with a different number of binary sensors 21 would create a different binary sequence. Also, the modes of transmission associated with the binary codes may vary depending on the transmission of the vehicle, such that the binary codes can in one embodiment correspond to manual modes of transmission (gears 1, 2, 3, 4, 5 and Reverse), for instance.

If the control unit 30 detects a binary code for a first position (such as the Park position of FIG. 6a, for instance) and another binary code for a second position (such as the intermediate position of FIG. 6b, for instance), these binary codes are checked against the binary sequence to see if they indeed correspond to adjacent angular positions of the actuation element 10. Thus, the control unit 30 determines a current position of the actuation element 10 at least partly based on a previously detected position.

If the detected position is not deemed adjacent to a previously detected position, then the control unit 30 detects a fault. Such a fault would for instance occur if the Park position, in this example having the binary code 001, would be followed by a Neutral position, having the binary code 100. The control unit 30 would then determine that a fault had been detected.

The control unit 30 would also detect a fault if a binary code is received that is not included in the binary sequence, such as 111 (indicating that all three binary sensors 21 detect the presence of a trigger element) or 000 (indicating that no binary sensor 21 detects the presence of a trigger element).

A fault could for instance indicate that at least one of the binary sensors 21 has broken or that something interferes with the trigger device 20 so that a binary sensor 21 detects the presence of something other than a trigger element on the lower surface 13 of the actuation element 10. A fault can then be signaled to the driver to indicate that the vehicle needs to be serviced.

Thanks to the invention, the automated return to park feature mentioned above can also be realized by through of the sensor assembly 20 and the control unit 30. When a driver has parked the vehicle, the actuation element 10 can remain in its position, for instance in the Drive position, even though the transmission is changed to Park as the engine is switched off. When the vehicle is started again, the control unit 30 compares a current angular position of the actuation element 10 with the binary code it receives from the sensor assembly 20, and compares it to a current state of transmission, namely Park, to see if they are associated with each other. If the answer is no, the control unit 30 performs such an association and then also associates remaining binary codes of the binary sequence so that every binary code receives a new association with a state of transmission in the same order as previously, i.e. so that states of transmission that were previously adjacent remains so. Thus, when the driver starts the vehicle, the transmission remains in the Park position and the visual indication element 41 corresponding to Park lights up. The operation of the vehicle can then be performed in the same way as before, with the driver selecting states or modes of transmission by rotating the actuation element 10.

As has already been described above, in this preferred embodiment the trigger pattern 54 is repeated on the trigger device 20, and this allows for a re-association of angular positions with states of transmission an unlimited number of times and starting from every position, since the binary sequence formed by the binary codes of each angular position will repeat itself for each trigger pattern 54.

Furthermore, the binary sequence is longer than one repetition of the trigger pattern 54, i.e. a rotation of the actuation element 10 through every position that corresponds to a state of transmission extends over more than one trigger pattern 54. This also serves to enable the re-association of the states of transmission, since the same binary code will correspond to more than one angular position of the actuation element 10.

The invention is not to be seen as limited by the embodiments described herein, but can be varied within the scope of the appended claims as is readily apparent to the person skilled in the art. For instance, instead of mounting one element of the sensor assembly 20 on the actuation element 10 and the other on the base 28, one element could be mounted along a circumference of the actuation element 10 and the other protruding from the base 28 or indeed from another structure rigidly connected to the base 28 in the same manner as the detent plunger 25.

The invention claimed is:

1. A shifter for controlling a transmission of a motor vehicle, the shifter comprising:
    a rotatably mounted actuation element including a plurality of angular positions;
    a sensor assembly comprising:
        an annular detent track mounted to the actuation element, the annular detent track including a circumferential edge having a plurality of detent positions and an axial surface;
        a detent plunger that selectively extends into one of the plurality of detent positions;
        a trigger device including a plurality of trigger elements that extend axially outwardly of the axial surface parallel to an axis of rotation of the detent track, the plurality of trigger elements being arranged in at least three annular trigger lines;
        a plurality of binary sensors that selectively detect one or more of the plurality of detent elements; wherein the detent track and the detent plunger are arranged to interact in such a way that every angular position of the actuation element corresponds to a rest position for the detent plunger along the detent track; and
    a control unit for determining an angular position of the actuation element based on an input signal from the sensor assembly, wherein the plurality of binary sensors include at least three binary sensors, wherein the at least three binary sensors arranged such that each binary sensor corresponds to one annular trigger line of the trigger device, wherein each annular trigger line comprises a plurality of trigger elements that are arranged to be individually detectable by corresponding ones of the at least three binary sensors, and
    wherein the plurality of trigger elements in each annular trigger line are distributed such that at least one of the binary sensors is able to detect a presence of a trigger element in one of the annular trigger lines for each angular position of the actuation element, wherein at least one trigger element from each annular trigger line together form a trigger pattern, and the trigger pattern is repeated at least twice on the trigger device to initiate a shift command.

2. The shifter according to claim 1, wherein the trigger pattern is repeated at least four times to initiate a shift command.

3. The shifter according to claim 1, wherein at least two of the angular positions of the actuation element are associated each with a state of transmission of the motor vehicle.

4. The shifter according to claim 3, wherein a rotation of the actuation element through every angular position that corresponds to a state of transmission extends over more than one trigger pattern.

5. The shifter according to claim 3, wherein the control unit is arranged to compare a current position of the actuation element with a current state of transmission and determine if they are associated with each other, and to associate them if the current position is associated with another state of transmission.

6. The shifter according to claim 1, wherein each angular position of the actuation element corresponds to a binary code in the control unit in such a way that a binary sequence is formed by the binary codes for all angular positions, and wherein the control unit is arranged to detect a fault if the actuation element is rotated from a first position to a second position, and the binary code for the second position is not adjacent to the binary code for the first position in the binary sequence.

7. The shifter according to claim 1, wherein the control unit is arranged to detect a fault based on at least one of the at least three binary sensors detect a presence of a trigger element at the same time and no binary sensor detects a presence of a trigger element.

8. The shifter according to claim 1, wherein the control unit determines a current position of the actuation element based, at least in part, on a previously detected position.

9. A method for controlling a transmission of a motor vehicle by a shifter, the method comprising:

using at least three binary sensors to detect a presence or absence of a trigger element in an annular trigger line that extends axially outwardly of a detent track, each of the at least three binary sensors being able to detect trigger elements of arranged in one of at least three annular trigger lines, each of the at least three binary sensors including a first element;

using input from the at least three binary sensors to determine an angular position of an actuation element and determining a state of transmission associated with the angular position; and transmitting a signal to a transmission of a motor vehicle indicating the state of transmission associated with the angular position, wherein the trigger elements of the at least three annular trigger line are arranged in such a way that at least one of the at least three binary sensors detects a presence of a trigger element for each angular position of the actuation element, and wherein at least one trigger element from each of the at least three annular trigger lines together form a trigger pattern and wherein the trigger pattern is repeated at least twice to initiate a shift command.

10. The method of claim 9, wherein the trigger pattern is repeated at least four times to initiate a shift command.

11. The method according to claim 9, further comprising:
using a visual indication element to indicate the state of transmission associated with the angular position of the actuation element.

12. The method according to claim 9, wherein the detent track interacts with a detent plunger in such a way that the detent plunger is in a rest position along the detent track for each angular position of the actuation element.

13. The method according to claim 9, wherein a rotation of the actuation element through every position that corresponds to a state of transmission extends over more than one trigger pattern.

14. The method according to claim 9, further comprising:
comparing the angular position of the actuation element with a current state of transmission during start of the motor vehicle to determine if the angular position and the current state of transmission are associated with each other; and associating the angular position with the current state of transmission if they are not already associated with each other.

* * * * *